US008866427B2

United States Patent
Oyori et al.

(10) Patent No.: US 8,866,427 B2
(45) Date of Patent: Oct. 21, 2014

(54) MOTOR CONTROL APPARATUS AND METHOD

(75) Inventors: Hitoshi Oyori, Tokyo (JP); Masaaki Monte, Ise (JP)

(73) Assignees: IHI Aerospace Co., Ltd., Tokyo (JP); Sinfonia Technology Co., Ltd., Tokyo (JP)

( * ) Notice: Subject to any disclaimer, the term of this patent is extended or adjusted under 35 U.S.C. 154(b) by 123 days.

(21) Appl. No.: 13/436,409

(22) Filed: Mar. 30, 2012

(65) Prior Publication Data

US 2012/0256577 A1 Oct. 11, 2012

(30) Foreign Application Priority Data

Apr. 5, 2011 (JP) ................................. 2011-083737

(51) Int. Cl.
| | |
|---|---|
| H02P 3/00 | (2006.01) |
| G05B 19/29 | (2006.01) |
| B64C 17/06 | (2006.01) |
| G01P 3/481 | (2006.01) |
| H02P 23/03 | (2006.01) |

(52) U.S. Cl.
CPC ............... *H02P 23/03* (2013.01); *G01P 3/481* (2013.01)
USPC ........................... 318/461; 318/603; 318/649

(58) Field of Classification Search
USPC .......................................... 318/461, 603, 649
See application file for complete search history.

(56) References Cited

U.S. PATENT DOCUMENTS

| | | | | |
|---|---|---|---|---|
| 3,863,153 | A | | 1/1975 | Eshraghian |
| 5,008,606 | A | * | 4/1991 | Koehler et al. ............... 318/649 |
| 5,235,262 | A | * | 8/1993 | Takeuchi et al. ............. 318/603 |
| 6,972,876 | B2 | * | 12/2005 | Yokochi ........................ 358/471 |
| 2002/0080420 | A1 | * | 6/2002 | Yokochi ........................ 358/471 |
| 2007/0108966 | A1 | | 5/2007 | Kim |

FOREIGN PATENT DOCUMENTS

| | | |
|---|---|---|
| EP | 1 865 328 A2 | 12/2007 |
| JP | 2001-178166 A | 6/2001 |

OTHER PUBLICATIONS

Extended European Search Report for EP 12 00 2209, dated Feb. 20, 2013.

* cited by examiner

*Primary Examiner* — Eduardo Colon Santana
*Assistant Examiner* — Gabriel Agared
(74) *Attorney, Agent, or Firm* — Marshall, Gerstein & Borun LLP

(57) ABSTRACT

When it is determined that the number of times that motor rotation-indicative quantity has been detected has exceeded a measurement interval, a feedback speed value is calculated from a motor rotation-indicative quantity detected immediately before, a motor rotation-indicative quantity detected immediately before the last time a measurement interval determination means determined that the number of times had exceeded the measurement interval, and time that has elapsed since the last time the measurement interval determination means determined that the number of times had exceeded the measurement interval, and the measurement interval having a length calculated from a greater one between the calculated feedback speed value and a speed command value is set for the measurement interval determination means to refer to.

6 Claims, 4 Drawing Sheets

MOTOR CONTROL APPARATUS AND METHOD

BACKGROUND OF THE INVENTION

1. Field of the Invention

This invention relates to a motor control apparatus and a motor control method, more specifically, a motor control apparatus and a motor speed control method for use in aircrafts and in the space field.

2. Description of the Related Art

Conventional control of motor rotating speed using a motor-position detecting encoder is feedback control in which motor rotating speed is calculated from a change in sensor position in a control cycle of a predetermined length, and a regulated rotating speed value based on a difference between a desired value and the calculated actual value of motor rotating speed is fed to the motor.

In this control, the motor speed may decrease below normal speed, resulting in a decrease in the number of encoder output signals obtained in the control cycle. In low-speed rotation of the motor in which the interval between the encoder's output signals is longer than the control period, or length of the control cycle, the motor speed may not be detected in each control cycle, leading to decreased control accuracy.

To deal with this problem, there is known a method in which in normal-speed rotation of the motor, a first speed value detected from a change in position in one control cycle is fed back in each control cycle, while in low-speed rotation of the motor, a speed value estimated from a toque command value and a second speed value detected is fed back (see Japanese Patent Application Laid-open No. 2001-178166 Publication).

Changing the way of control depending on whether the motor is rotating at normal speed or low speed, specifically whether the change in position is greater than a predetermined value or not as in the prior art disclosed in the aforementioned publication, however, unfavorably complicates the configuration of the apparatus and the control method.

The aforementioned publication mentions that in low-speed rotation of the motor, a change in position is measured at intervals of N times the control period, but does not mention how to determine N. Thus, in the case in which the rotating speed setpoint or the actual motor rotating speed changes steeply, the technique disclosed in the aforementioned publication may not necessarily be able to maintain control stability.

SUMMARY OF THE INVENTION

The present invention has been made to solve the above-mentioned problems. An object of the present invention is to provide a motor control apparatus and method capable of controlling a motor stably and accurately, even when motor rotating speed is changed.

In order to achieve the above object, the present invention provides a motor control apparatus for controlling speed of a motor on the basis of a speed command value and a feedback speed value, comprising: a motor rotation-indicative quantity detection means for detecting rotation-indicative quantity of the motor at predetermined intervals; a counting means for counting the number of times that the motor rotation-indicative quantity detection means has detected the rotation-indicative quantity of the motor; a measurement interval determination means for determining whether the number of times counted by the counting means has exceeded a measurement interval or not; a speed calculation means for calculating a feedback speed value when the measurement interval determination means determines that the number of times counted has exceeded the measurement interval, the speed calculation means calculating the feedback speed value from a rotation-indicative quantity detected by the motor rotation-indicative quantity detection means immediately before, a rotation-indicative quantity detected by the motor rotation-indicative quantity detection means immediately before the last time the measurement interval determination means determined that the number of times counted had exceeded the measurement interval, and time that has elapsed since the last time the measurement interval determination means determined that the number of times counted had exceeded the measurement interval; and a measurement interval calculation means for setting the measurement interval for the measurement interval determination means to refer to, the measurement interval calculation means comparing the feedback speed value calculated by the speed calculation means and a speed command value, calculating a length which the measurement interval should have from a greater one of the two values compared, and setting the measurement interval having the calculated length.

BRIEF DESCRIPTION OF THE DRAWINGS

The present invention will become more fully understood from the detailed description given hereinafter and the accompanying drawings which are given by way of illustration only, and thus, are not limitative of the present invention, and wherein.

DETAILED DESCRIPTION OF THE INVENTION

With reference to the drawings attached, embodiments of the present invention will be described below.

Figure 1:
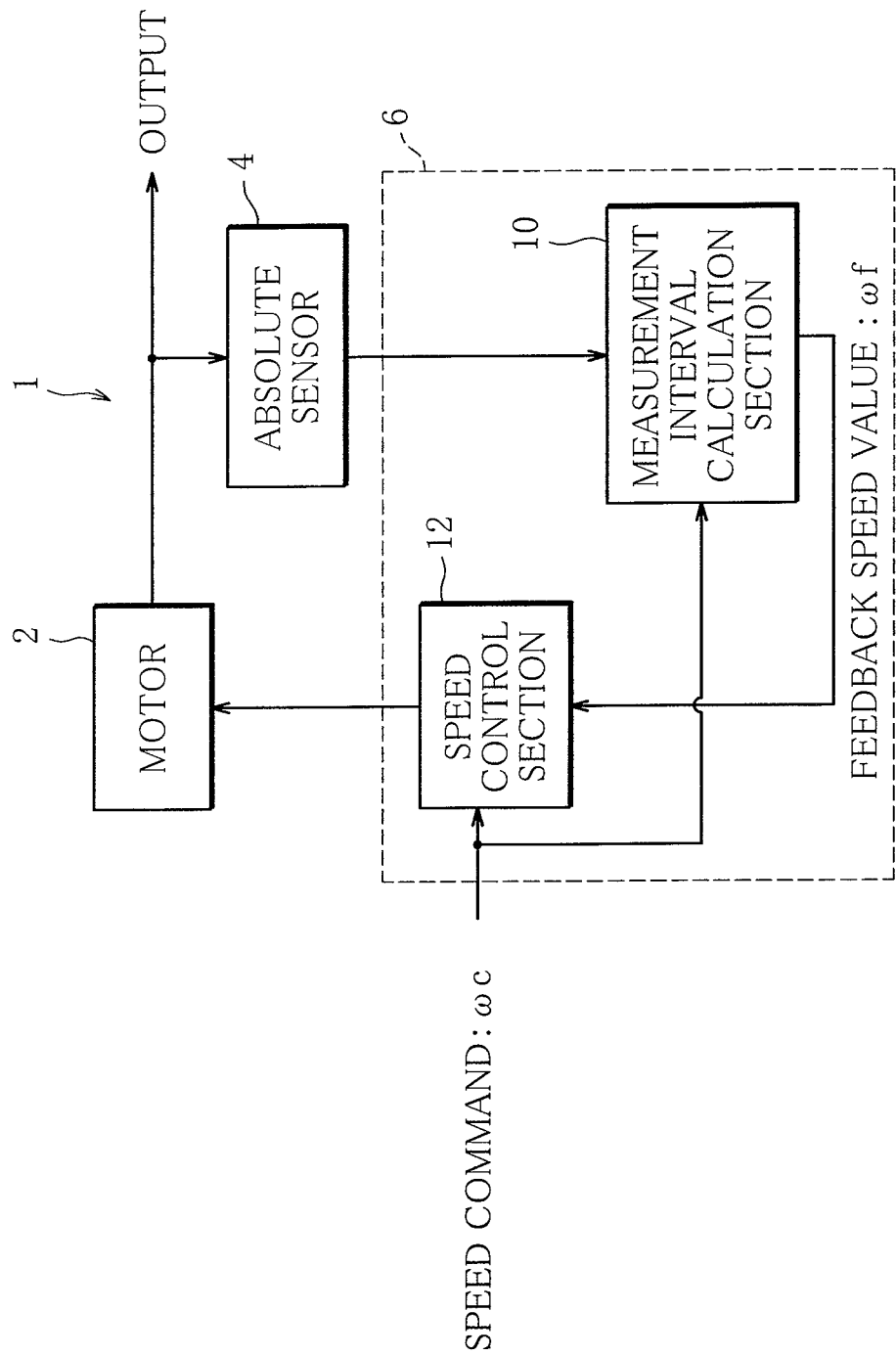
FIG. 1 is a schematic structural diagram showing a motor control apparatus according to a first embodiment of the present invention.

FIG. 1 is a schematic structural diagram showing a motor control apparatus according to a first embodiment of the present invention.

As seen in FIG. 1, a motor control apparatus 1 comprises a motor 2, an absolute sensor (motor rotation-indicative quantity detection means) 4 and a calculation section 6, connected to each other. The absolute sensor 4 is connected to an input of the calculation section 6 and the motor 2 to an output thereof.

Although not shown, the motor 2 supplies power to an object to be driven by the motor 2.

The absolute sensor 4 detects angular position of the motor 2, and feeds the detected angular position to the calculation section 6.

The calculation section 6 includes a measurement interval calculation section 10 and a speed control section 12. Although the calculation section 6 has functions other the above-mentioned, the description of the present embodiment will be concentrated on the functions involved in motor speed control.

The measurement interval calculation section 10 calculates a length of the measurement interval after which the angular position, obtained from the absolute sensor 4 at predetermined intervals, should be determined, calculates a feedback speed value ωf and feeds it to the speed control section 12.

The speed control section 12 controls the speed of the motor 2 by determining a regulated speed value from a speed command value ωc and the feedback speed value ωf received and feeding the regulated speed value to the motor 2.

The speed control method performed by the first-embodiment motor control apparatus 1 configured as described above will be described below.

Figure 2:
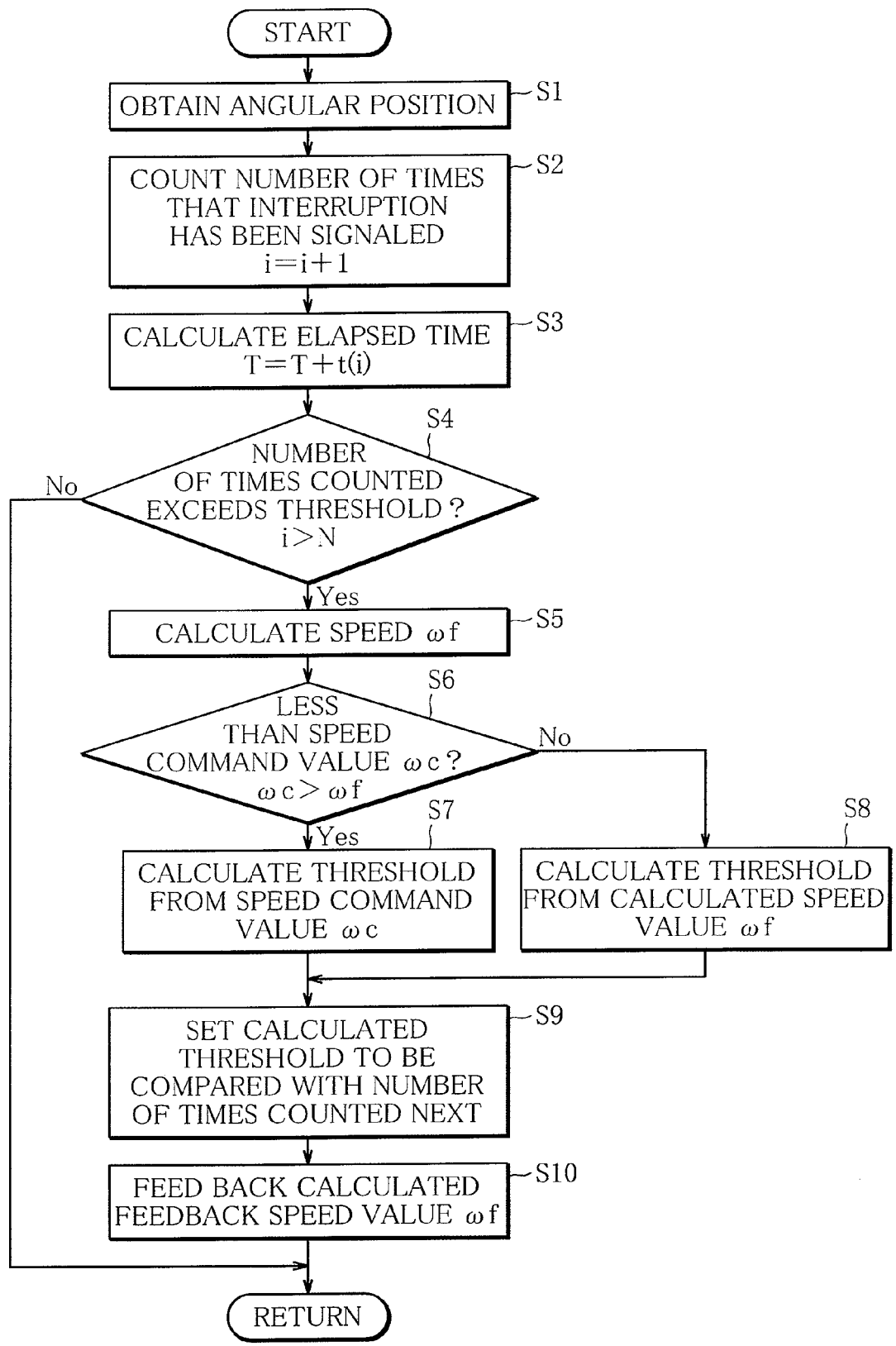
FIG. 2 is a flow chart showing a motor speed control method according to the first embodiment.

FIG. 2 is a flow chart showing a method of controlling the motor 2. The flow chart shows the process performed by software, or in other words, by the measurement interval calculation section 10 executing programs. The process is performed each time an interrupt signal is received. The interrupt signals are emitted at predetermined intervals.

At step S1, on receipt of an interrupt signal, an angular position of the motor 2 (motor rotation-indicative quantity) is obtained from the absolute sensor 4. The angular position Ra(m) stored is updated with the newly obtained value (motor rotation-indicative quantity detecting step). Here, m is an integer greater than 0, and used to distinguish the angular position Ra(m) to be determined this time from the angular position Ra(m−1) determined last time, which will be mentioned below.

At step S2, the number i of times that interruption has been signaled (number of times) is counted (counting means, counting step). The number i of times that interruption has been signaled is the number of interrupt signals received after a current threshold, to be compared with the number of times counted, was set.

At step S3, the length of time t(i) equal to the predetermined interval between the interrupt signals is added to elapsed time T stored. The elapsed time T is the time that has elapsed after the current threshold, described below, was set.

At step S4, whether the number i of times counted at step S2 exceeds the threshold N (measurement interval) or not is determined (measurement interval determination means, measurement interval determining step). If the result of determination is "yes", the flow of control goes to step S5, and if "no", the process shown by the flow chart comes to an end.

At step S5, a change in angular position Ra(m)−Ra(m−1) is calculated from the angular position Ra(m−1) determined the last time it was determined that the number i of times counted had exceeded a threshold N and the angular position Ra(m) obtained immediately before at step S1, and a feedback speed value ωf to be fed back to the speed control section 12 is calculated from the change in angular position and the elapsed time T calculated at step S3 (speed calculation means, speed calculating step).

At step S6, whether the calculated feedback speed value ωf is less than a speed command value ωf or not is determined (measurement interval calculation means, measurement interval calculating step). If the result of determination is "yes", the flow of control goes to step S7.

At step S7, a new threshold N is calculated from the speed command value ωc (measurement interval calculation means), measurement interval calculating step). A threshold N to be calculated at step S7 or step S8, described later, may be calculated using a map, or function stored in advance in a memory device or the like, not shown.

The threshold N calculated from the speed command value ωc at step S7 is lower than the threshold N calculated from the feedback speed value ωc. The greater the speed command value ωc, the lower threshold N is calculated, and the smaller the speed command value ωc, the higher threshold N is calculated. The threshold N is calculated so that the change in angular position Ra(m)−Ra(m−1) will not exceed 180° in the highest speed rotation of the motor 2.

If the result of determination at step S6 is "no", the flow of control goes to step S8.

At step S8, a new threshold N is calculated from the feedback speed value ωf (measurement interval calculation means, measurement interval calculating step).

The threshold N calculated from the feedback speed value ωf at step S8 is lower than the threshold N calculated from the speed command value ωc. Similarly to the above-described threshold N, the greater the feedback speed value ωf, the lower threshold N is calculated, and the smaller the feedback speed value ωf, the higher threshold N is calculated.

Next at step S9, the threshold N calculated at step S7 or S8 is set to be compared with the number i of times counted next (measurement interval calculation means, measurement interval calculating step), and the number i of times and the elapsed time T are set back to their initial values (0, for example).

At step S10, the feedback speed value ωf, calculated at step 5, is fed to the speed control section 12.

As described above, in the present embodiment, the number i of times that interruption has been signaled is counted, and when the number i of times counted exceeds the current threshold N, a feedback speed value ωf is calculated from a change in angular position, which is calculated from an angular position Ra(m−1) determined last time and an angular position Ra(m) obtained immediately before, and time T that has elapsed since the last time it was determined that the number of times counted had exceeded a threshold. The calculated feedback speed value ωf and the speed command value ωc are compared, and a new threshold N is calculated from a greater one of the two values compared, and set to be compared with the number of times counted next.

The measurement intervals at which feedback speed values ωf representing actual speed should be calculated are automatically regulated by calculating a length of the next measurement interval from a greater one between the current speed command value ωf and the current feedback speed value ωf. This ensures stable control, and thus, smooth motor 2 speed control, irrespective of whether the motor 2 is rotating at low speed or high speed.

A threshold N is calculated from a greater one between a speed command value ωf and a feedback speed value ωf. This calculation only involves simple arithmetic operations, leading to a reduced load on operational equipment.

The next threshold N, and thus, the next measurement interval after which the next feedback speed value ωf should be calculated is calculated from a greater one between the current speed command value ωf and the current feedback speed value ωf. This follows that in the situation that the speed command ωc is steeply increasing from a lower value to a higher value, a threshold N calculated from a speed command value ωc, higher than a feedback speed value ωf, is set, and in the situation that the speed command ωc is decreasing from a higher value to a lower value, a threshold N calculated from a feedback speed value ωf, higher than a speed command value ωc, is set.

This means that when the motor 2 is rotating at high speed, feedback speed values ωf are calculated at short intervals, compared with when the motor 2 is rotating at low speed, which reduces time taken for motor 2 speed control, and thus, prevents a decrease in control accuracy and provides improved responsiveness, and ensures smooth control also in the period before the motor 2 attains the current speed command value ωc.

Next, a second embodiment of the present invention will be described.

The motor control apparatus and method according to the second embodiment differs from the first embodiment in that an incremental sensor is used in place of the absolute sensor 4; apart from this, they are similar. The description will therefore be concentrated on the difference; the description of features common to the two embodiments will be omitted.

Figure 3:
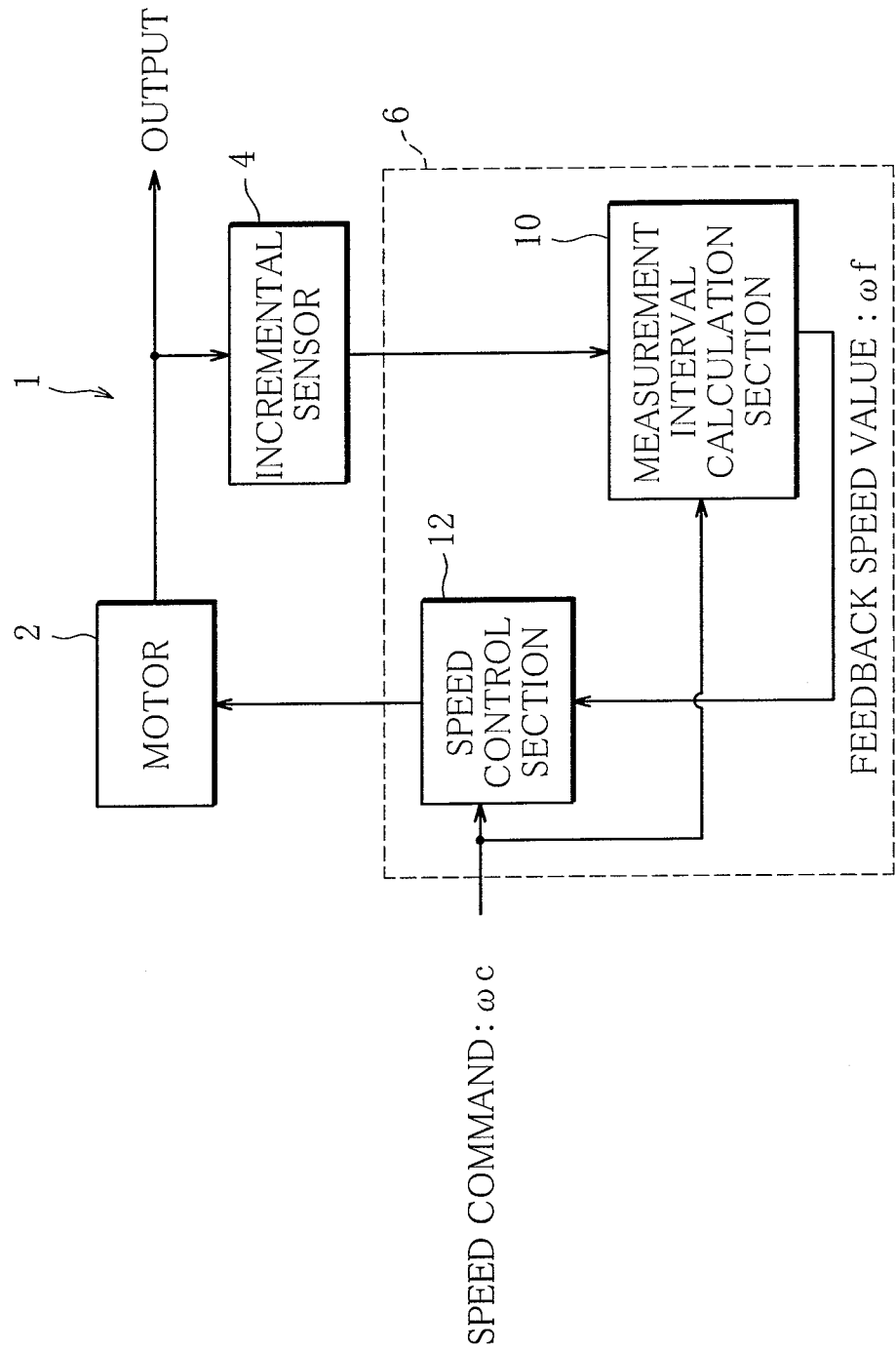
FIG. 3 is a schematic structural diagram showing a motor control apparatus according to a second embodiment of the present invention.

FIG. 3 is a schematic structural diagram showing a motor control apparatus 1 according to the second embodiment of the present invention.

As seen in FIG. 3, a motor 2, an incremental sensor (motor rotation-indicative quantity detection means) 4a, and a calculation section 6 are connected to each other. The incremental sensor 4a is connected to an input of the calculation section 6 and the motor 2 to an output thereof.

The incremental sensor 4a counts the number of rotation-indicative pulses emitted accompanying rotation of the motor 2, and feeds the number of rotation-indicative pulses counted to the calculation section 6.

The speed control method performed by the second-embodiment motor control apparatus 1 configured as described above will be described below.

Figure 4:
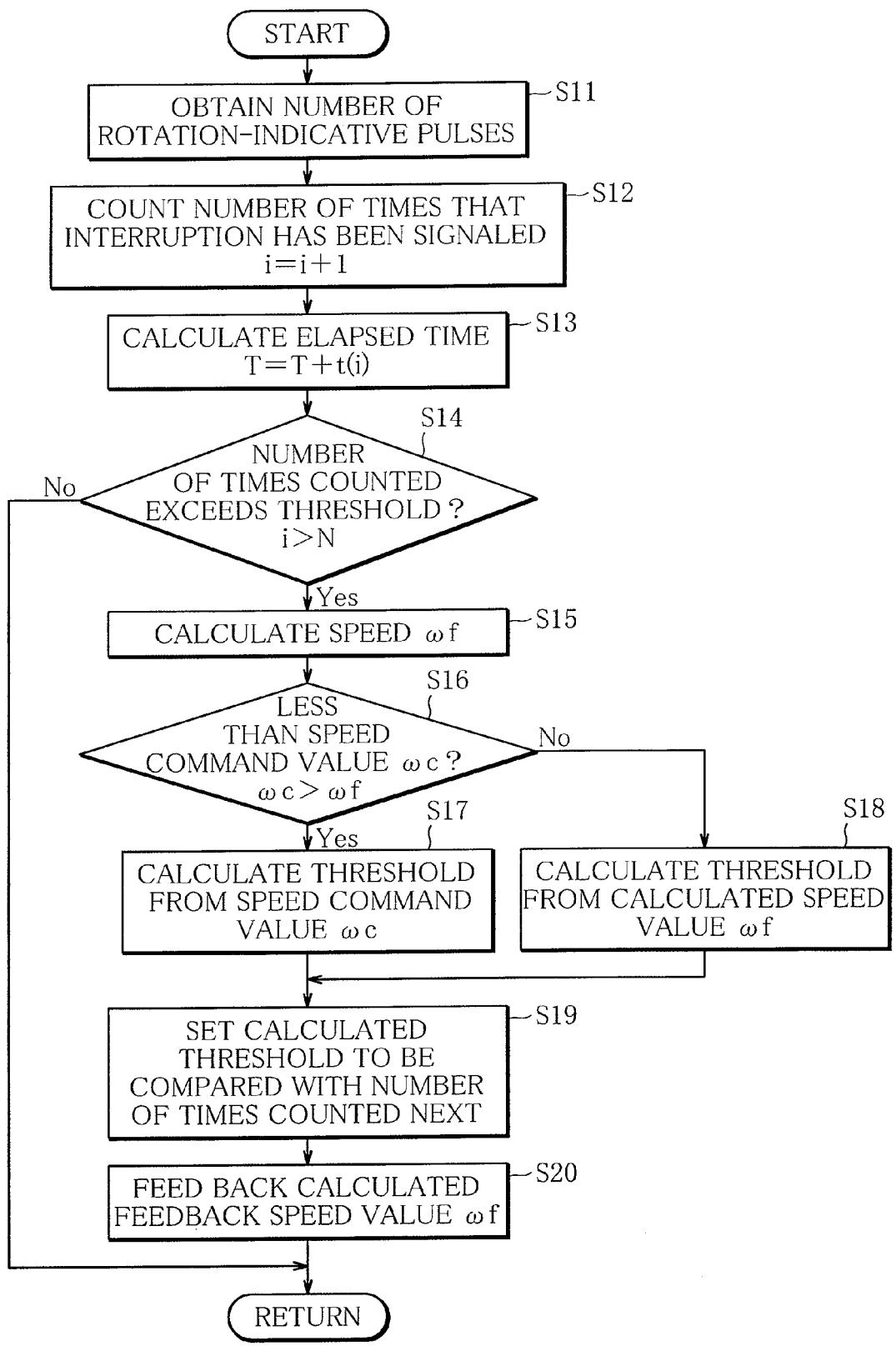
FIG. 4 is a flow chart showing a motor speed control method according to the second embodiment.

FIG. 4 is a flow chart showing a method of controlling the motor 2.

At step S11, on receipt of an interrupt signal, the number of rotation-indicative pulses that have been emitted accompanying the rotation of the motor 2 (motor rotation-indicative quantity) is obtained from the incremental sensor 4 (motor rotation-indicative quantity detection means). The number of rotation-indicative pulses Rp(m) stored is updated with the newly obtained value (motor rotation-indicative quantity detection step).

At step S15, a change in angular position is calculated from the number of rotation-indicative pulses Rp(m−1) determined the last time it was determined that the number of times that interruption had been signaled had exceeded a threshold N and the number of rotation-indicative pulses Rp(m) obtained immediately before at step S1, and a feedback speed value ωf to be fed back to the speed control section 12 is calculated from the change in angular position and the elapsed time T calculated at step S3 (speed calculation means, speed calculating step).

As understood from the above, in the second embodiment, the number i of times that interruption has been signaled is counted, and when the number i of times counted exceeds the current threshold N, a feedback speed value ωf is calculated from a change in angular position, which is calculated from the number of rotation-indicative pulses Rp(m−1) determined last time and the number of rotation-indicative pulses Rp(m) obtained immediately before, and time T that has elapsed since the last time it was determined that the number i of times counted had exceeded a threshold, and a new threshold N is calculated from a greater one between a speed command value ωc and the calculated feedback speed value ωf and set to be compared with the number of times counted next.

The second embodiment thus provides the same advantages as the first embodiment provides.

Two embodiments of the present invention have been described above; the present invention is however not restricted to the described embodiments.

For example, although in the described embodiments, a threshold N to be compared with the number i of times that interruption has been signaled is set, a threshold to be compared with elapsed time T may be set.

Further, although a feedback speed value ωf is fed back to the speed control section 12 at step S10 in the first embodiment and at step S20 in the second embodiment, respectively, it may be fed back to the speed control section 12 at any time after step S4 in the first embodiment, and any time after step S14 in the second embodiment.

The present invention is suitable for servomotors used in steering systems or in pump control.

The invention being thus described, it will be obvious that the same may be varied in many ways. Such variations are not be regarded as a departure from the spirit and scope of the invention, and all such modifications as would be obvious to one skilled in the art are intended to be included within the scope of the following claims.

What is claimed is:

1. A motor control apparatus for controlling speed of a motor on the basis of a speed command value and a feedback speed value, comprising:
    a motor rotation-indicative quantity detection means for detecting rotation-indicative quantity of the motor at predetermined intervals,
    a counting means for counting the number of times that the motor rotation-indicative quantity detection means has detected the rotation-indicative quantity of the motor,
    a measurement interval determination means for determining whether the number of times counted by the counting means has exceeded a measurement interval or not,
    a speed calculation means for calculating a feedback speed value when the measurement interval determination means determines that the number of times counted has exceeded the measurement interval, the speed calculation means calculating the feedback speed value from a rotation-indicative quantity detected by the motor rotation-indicative quantity detection means immediately before, a motor rotation-indicative quantity detected by the motor rotation-indicative quantity detection means immediately before the last time the measurement interval determination means determined that the number of times counted had exceeded the measurement interval, and time that has elapsed since the last time the measurement interval determination means determined that the number of times counted had exceeded the measurement interval, and
    a measurement interval calculation means for setting the measurement interval for the measurement interval determination means to refer to, the measurement interval calculation means: (i) comparing the feedback speed value calculated by the speed calculation means and a speed command value to determine which is greater, (ii) calculating a first length for the measurement interval when the feedback speed value is greater than the speed command value, (iii) calculating a second length, which is less than the first length, for the measurement interval when the speed command value is greater than the feedback speed value, and (iv) setting the measurement interval to have the calculated first length or the calculated second length.

2. The motor control apparatus according to claim 1, wherein
    the measurement interval calculation means calculates the length of the measurement interval such that the measurement interval is shorter when the motor is rotating at higher speed.

3. The motor control apparatus according to claim 1, wherein
    the motor rotation-indicative quantity detection means is an absolute sensor.

4. The motor control apparatus according to claim 1, wherein,
the motor rotation-indicative quantity detection means is an incremental sensor.

5. A motor control method for controlling speed of a motor on the basis of a speed command value and a feedback speed value, comprising:
a motor rotation-indicative quantity detecting step of detecting rotation-indicative quantity of the motor, performed at predetermined intervals,
a counting step of counting the number of times that the rotation-indicative quantity of the motor has been detected by the motor rotation-indicative quantity detecting step,
a measurement interval determining step of determining whether the number of times counted by the counting step has exceeded a measurement interval,
a speed calculating step of calculating a feedback speed value, performed when it is determined by the measurement interval determining step that the number of times counted has exceeded the measurement interval, the feedback speed value being calculated from a motor rotation-indicative quantity detected by the motor rotation-indicative quantity detecting step performed immediately before, a motor rotation-indicative quantity detected by the motor rotation-indicative quantity detecting step performed immediately before the last time it was determined by the measurement interval determining step that the number of times counted had exceeded the measurement interval, and time that has elapsed since the last time it was determined by the measurement interval determining step that the number of times counted had exceeded the measurement interval, and
a measurement interval calculating step of: (i) comparing the feedback speed value calculated by the speed calculating step and a speed command value to determine which is greater, (iii) calculating a first length for the measurement interval when the feedback speed value is greater than the speed command value, (iii) calculating a second length, which is less than the first length, for the measurement interval when the speed command value is greater than the feedback speed value, and (iv) setting the measurement interval to have the calculated first length or the calculated second length.

6. The motor control method according to claim 5, wherein in the measurement interval calculating step, the length of the measurement interval is calculated such that the measurement interval is shorter when the motor is rotating at higher speed.

* * * * *